Nov. 13, 1934.            H. N. LUMM                1,980,415
                       MAGNETIC COMPASS
                     Filed Nov. 17, 1930
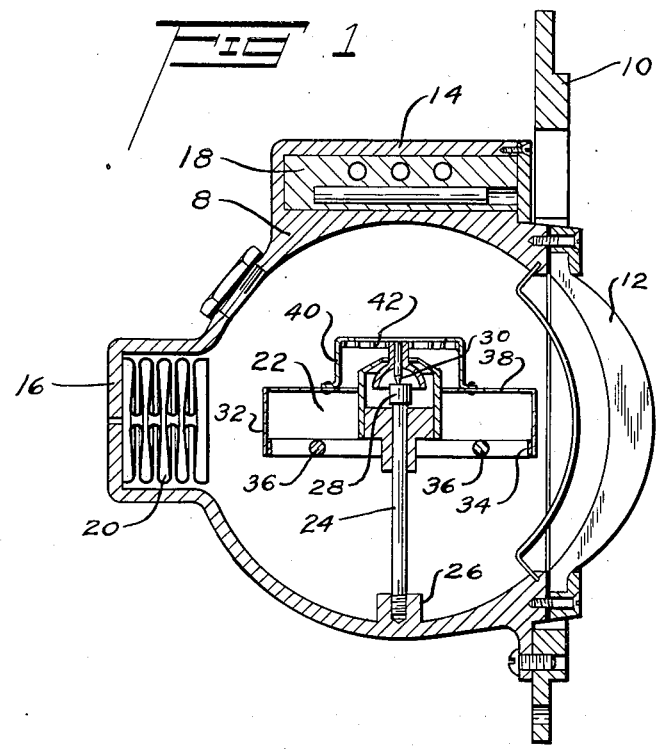
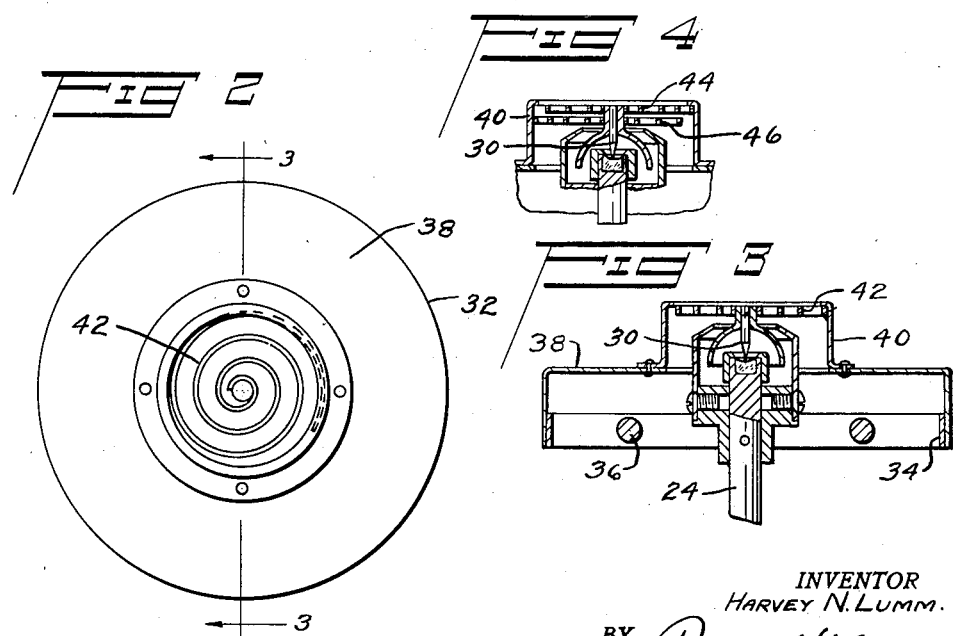
INVENTOR
HARVEY N. LUMM.
BY Robert H. Young
ATTORNEY Patented Nov. 13, 1934

1,980,415

UNITED STATES PATENT OFFICE 1,980,415

MAGNETIC COMPASS

Harvey Newton Lumm, Dayton, Ohio, assignor to Elgin National Watch Company, Chicago, Ill., a corporation of Illinois Application November 17, 1930, Serial No. 496,185

3 Claims. (Cl. 33—223)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to magnetic compasses and contains certain improvements therein which will particularly adapt the same for use in connection with aircraft, although, of course, my improved compass may be used with any nautical or land vehicles; this invention being applicable to liquid compasses on which the magnetic element, which may have attached thereto a card or dial having the usual meridian marks or points inscribed thereon, is suspended for rotation on a central pivot in the liquid contained in an hermetically sealed casing.

It is a well known fact that the liquid which serves to a considerable degree to dampen the oscillations of the compass card, under excessive vibrations of the compass becomes highly turbulent, ofttimes a liquid swirl is induced, thus not only losing its damping effectiveness but in turn imparting impulses which by their cumulative action magnify the usual card oscillations and frequently assume such amplitudes that the card is deviated from the normal to positions where the influence of the vertical component of the earth's magnetic field on the compass is inevitable. Aside from the purely vibrational disturbance of the magnetic system and of the card, there is the deflection of the system called "dragging" brought about by the influence of curved motion on the compass filling. The more pronounced the drag the longer will it be before the system comes to rest. Thus, where the oscillation is slow it is quite impossible to take readings quickly and accurately.

With the above in mind, among other objects it is the primary purpose of my invention, therefore, to provide in a magnetic compass, means for centralizing or maintaining the needle or magnetic system and/or card in the neutral position irrespective of the dynamic influences.

Accordingly a compass embodying the present invention is, by way of illustration, provided with means for floatingly and resiliently suspending a magnetic system, of the card moving type, from a central pivot, as by means of a horizontally disposed helical coil spring, having one end attached to the card and the other end to the pivot whereby angular or bodily movement of said system, influenced by dynamic forces in a horizontal, vertical, or any intermediate plane, or in a combination of any two or more planes, is opposed and quickly restores the system to its neutral position.

Referring to the drawing, in which, what I now consider the preferred forms of my invention, are shown:

Fig. 1 is a sectional view of a side elevation of a compass embodying my invention;

Fig. 2 is an enlarged top plan view of the compass card system;

Fig. 3 is a sectional view taken on the line 3—3 of Fig. 2; and

Fig. 4 is a fractional sectional view showing a modification of my invention.

Referring to Fig. 1, the numeral 8 designates any suitable form of casing and, as shown, is preferably of internal spherical form. This casing has a mounting bracket 10 fixed thereto and is provided with a spherically shaped glass 12 so that it is entirely inclosed. Made integral with the casing at the top and rear sides thereof are two casings 14 and 16, the former for the compensating magnets holder or carrier 18 and the latter for the expansible sylphon 20. Within the casing is a suitable liquid mixture, such as alcohol and water, which serves to damp out the usual vibrations of the magnetic system and to relieve its pivot of the greater portion of the weight thereof, and suspended therein is, by way of illustration, a card system 22, the equilibrium or neutral position of which is a resultant of the downward weight, the upward force of buoyancy, and the magnetic torque all combined.

Any suitable supporting means may be provided for pivotally supporting the card system 22 and, as shown, consists of a post 24 threaded into a boss 26 at the bottom of the casing. Seated at the upper end of the post is the usual jewel 28 on which rests the pivot pin 30 or the like, by means of which the magnetic or card system is rotatably supported. The compass card proper is of the usual and well known construction and is shown preferably to consist of a cylindrical shaped member 32 made of any light material such as sheet brass, celluloid or the like, and has, snugly fitting around the bottom of the inner wall thereof, a reinforcing band 34, which serves as a support for the magnets 36. The card 32 is provided with an annular flange 38 and has concentrically positioned thereon and attached to the flange 38, a light ring shaped member 40. A helical coil spring 42 had one end attached to the pivot pin 30 and its other end attached to the ring 40 at its upper peripheral edge. The manner of attachment may be by means of rivets, soldering, or the like. This spring is of such strength as to normally hold the card system 22 in a substantially horizontal position and when wound or unwound by dragging, vibrations or any other dynamic influence, has a restoring force which cooperates with the magnetic moment to prevent or retard rotational deflection of the card system from the neutral; and also prevents or retards angular and bodily oscillations of the card 32 relative to its pivot 30 or vice versa when moved from their normal horizontal position by similar influences.

Fig. 4 illustrates a further embodiment of my invention. In accordance with this modification instead of having a single helical coil spring, as described above, two coil springs 44 and 46, the windings of which are in opposite directions, are slightly spaced one above the other and are attached to the pivot 30 and ring 40 in the manner above described. With this arrangement it is possible to obtain quicker response to the impulses from all directions.

While I have shown and described a compass card system provided with resilient means for opposing excessive vibrational and oscillatory movements, as well as to decrease the magnitude of the usual vibrations, of the system, the card proper, or its pivot, in all planes passing through the rotational axis thereof, it is well within the scope of my invention and I desire it to be distinctly understood that I may provide any means desired for this purpose and that various changes and alterations in the manner of suspension described might be made whereby only certain of these forced oscillations are opposed, without departing from my invention, and I do not limit myself to the precise details set forth but consider myself at liberty to make such changes and alterations as fairly fall within the spirit and scope of the appended claims.

What I claim as new and desire to secure by Letters Patent is:

1. The combination with a magnetic compass having a compass bowl, a liquid in said bowl, and magnetic indicating system suspended in said liquid, said system comprising an inverted pivot and a compass card supported thereby, of a spiral spring disposed entirely above the bearing point of said pivot and having one end connected to said pivot and the other connected to said card to yieldingly oppose the relative lateral and vertical movements of said card and pivot and angular movements about their axes relative to one another.

2. In a compass card system adapted for use in a liquid damped compass, a card, a magnet carried by said card, a pivot for said card and a spiral spring disposed in a horizontal plane relative to said card and substantially symmetrical with respect to said pivot and having one end connected to said card and the other end to the pivot for resiliently suspending said card from said pivot and for yieldingly opposing relative angular movements of said card and pivot.

3. In a compass card system adapted for use in a liquid damped compass, a card, a magnet carried by said card, an inverted pivot for said card and a spiral spring disposed in a horizontal plane and having its outer end connected to said card and its inner end connected to the pivot for resiliently suspending said card from said pivot and for yieldingly opposing relative angular movements of said card and pivot.

HARVEY NEWTON LUMM.